United States Patent [19]

Sasaki et al.

[11] Patent Number: 5,524,516
[45] Date of Patent: Jun. 11, 1996

[54] MITER SAW

[75] Inventors: Katsuhiko Sasaki; Mitsuyoshi Niinomi; Yoshinori Shibata, all of Anjo, Japan

[73] Assignee: Makita Corporation, Anjo, Japan

[21] Appl. No.: 198,780

[22] Filed: Feb. 18, 1994

[30] Foreign Application Priority Data

Feb. 19, 1993 [JP] Japan ................................. 5-054749
Feb. 19, 1993 [JP] Japan ................................. 5-054750

[51] Int. Cl.$^6$ ..................... B23D 45/02; B27B 5/20
[52] U.S. Cl. .................... 83/471.3; 83/473; 83/477.1; 83/486.1; 83/490; 83/699.61; 384/49; 403/50
[58] Field of Search ............................. 83/471.2, 471.3, 83/473, 477.1, 485, 486, 486.1, 490, 581, 699.61; 384/29, 42, 49; 403/87, 163, 23, 50, 51

[56] References Cited

U.S. PATENT DOCUMENTS

| | | | |
|---|---|---|---|
| 2,835,285 | 5/1958 | Gardner | 83/486.1 |
| 4,574,670 | 3/1986 | Johnson | 83/471.3 X |
| 4,721,175 | 1/1988 | Butler | 403/50 X |
| 4,799,803 | 1/1989 | Tanaka | 384/49 X |
| 4,869,142 | 9/1989 | Sato et al. | 83/467.1 |
| 5,054,352 | 10/1991 | Fushiya et al. | 83/468.3 |
| 5,146,825 | 9/1992 | Dehari | 83/397 |
| 5,241,888 | 9/1993 | Chen | 83/490 X |

FOREIGN PATENT DOCUMENTS 62-162001 10/1987 Japan .
3-129401 12/1991 Japan .

*Primary Examiner*—Eugenia Jones
*Assistant Examiner*—Raymond D. Woods
*Attorney, Agent, or Firm*—Dennison, Meserole, Pollack & Scheiner

[57] ABSTRACT

A miter saw includes a base for placing a work thereon, a miter saw unit having a saw blade mounted thereon, and a slide support mechanism comprising a slide mechanism having a slide shaft mounted on one of the miter saw unit and the base, and a sleeve member mounted on the other of the miter saw unit and the base. The sleeve member is slidably movable relative to the spline shaft in an axial direction of the slide shaft, and the rotational position of the sleeve member is fixed relative to the slide shaft around an axis of the spline shaft. First and second covers are disposed around the slide shaft on opposite sides of the sleeve member forming first and second air chambers in communication with each other.

15 Claims, 7 Drawing Sheets

MITER SAW

BACKGROUND OF THE INVENTION

1. Field of the Invention

The present invention relates to a miter saw, and more particularly to a miter saw of the type called "slide saw" in which a miter saw unit having a saw blade mounted thereon is slidably movable in a horizontal direction relative to a base for placing a work thereon.

2. Description of the Prior Art

A conventional miter saw of this type includes a slide support mechanism for slidably supporting a miter saw unit relative to a base. The slide support mechanism includes a holder mounted on the base and a slide bar mounted on the miter saw unit. The slide bar is inserted into a guide hole formed on the holder and is supported by the holder directly or via a linear guide bearing.

In order to prevent the holder from rotation relative to the guide bar, a pair of the slide support mechanisms are provided in juxtaposed relationship with each other.

Japanese Laid-Open Utility Model Publication Nos. 62-162001 and 3-129401 and U.S. Pat. Nos. 4,869,142 and 5,146,825 disclose such pair of slide support mechanisms.

U.S. Pat. No. 5,054,352 in the name of the same assignee as the present application discloses the provision of a support shaft fixed to a slide bar in a diametrical direction. A first and a second bearing are mounted on an end projection of the support shaft and have central axes extending coaxially with and eccentrically from the axis of the support shaft, respectively. The first and second bearings are received in a guide rail formed on a turntable mounted on a base, so that the slide bar is effectively prevented from rotation relative to the base.

In case of the provision of a pair of the slide support mechanisms, a support portion having such juxtaposed pair of the support mechanisms must have a larger size in a lateral direction. Therefore, if such a support portion is adopted to a miter saw which is operable to obliquely cut a work with the support portion as well as a miter saw unit inclined in a lateral direction, the support portion may be interfered by the base as the inclination angle of the miter saw unit increases, so that an oblique cutting operation cannot be effectively performed.

Further, when the miter saw unit is pulled forwardly to perform the cutting operation in the horizontal direction, the pairs of the support mechanisms are moved at a position above the work, so that the support mechanisms may abut on the slide bar, the turntable, a fence member for positioning of the work or the work itself even if the inclination angle is relatively small. Therefore, the miter saw is not operable to cut a work having a larger thickness and is not operable to cut the work, with the miter saw unit inclined to a large extent.

In case of U.S. Pat. No. 5,054,352, although the rattling can be effectively prevented, the construction becomes rather complicated because of the provision of a particular mechanism including the support shaft, the first and second bearings, etc.

Meanwhile, with this kind of support mechanism, a slide bar is exposed on both sides of a holder in a longitudinal direction. In order to prevent deposition of dust on a sliding surface of the slide bar or in order to prevent the sliding surface from rusting, such exposed parts of the slide bar are normally covered by bellows. More specifically, two parts of the slide bar between the forward end of the slide bar and the forward portion of the holder and between the rear portion of the holder and the rear end of the slide bar are covered by the bellows. These bellows are cylindrical in configuration and form therein spaces closed from the outside.

Because of such closed spaces formed in the bellows, as the slide bar is moved to compress one of the bellows and to expand the other of the bellows, the air within one of the bellows are compressed, so that the slide bar cannot be smoothly moved. In order to obtain smooth movement of the slide bar, air holes each having a smaller diameter are formed on the bellows to permit the air within the bellows to be exhausted and absorbed as the bellows are compressed and expanded.

However, with the provision of the air holes, dust may enter the spaces within the bellows as the air is absorbed into the spaces through expansion of the bellows. Therefore, the aimed function of avoiding dust or rusting cannot be sufficiently performed.

Further, since the bellows thus perform the operation called "respiration", an unpleasant respiration sound is produced as the slide bar is moved.

Additionally, although the provision of the air holes may permit smooth movement of the slide bar to some extent, it is preferable that each air hole has a smaller diameter to ensure the aimed function of the bellows. For this reason, each air hole normally has an extremely small diameter, resulting in that the smooth movement of the air in and out from the bellows is prevented. Therefore, the smooth movement of the slide bar as well as the miter saw unit is limited to some extent. Particularly, as the speed of movement of the miter saw unit is increased, the resistance produced by the air is increased to prevent smooth movement.

SUMMARY OF THE INVENTION

It is, accordingly, an object of the present invention to provide a miter saw having a support mechanism which linearly slidably supports a miter saw unit relative to a base and which permits a cutting operation with the miter saw unit laterally inclined by a larger angle irrespective of the thickness of a work to be cut.

It is another object of the present invention to provide a miter saw having a support mechanism which linearly slidably supports a miter saw unit and which is operable to reliably prevent a slide bar or a holder mounted thereon from rattling in a rotational direction with a simple construction.

It is also an object of the present invention to provide a miter saw having a support mechanism which includes a slide shaft for slidably supporting a miter saw unit relative to a base and which permits smooth movement of the miter saw unit while maintaining the proper function of flexible covers such as bellows for preventing deposition of dust on the slide bar or preventing the slide bar from rusting.

It is a further object of the present invention to provide a miter saw having a support mechanism which includes a slide shaft for slidably supporting a miter saw unit relative to a base and which does not produce any unpleasant respiration sound when flexible covers such as bellows for covering the slide bar are compressed and expanded when the miter saw unit is moved.

According to the present invention, there is provided a miter saw comprising:

a base for placing a work thereon;

a miter saw unit having a saw blade mounted thereon; and a slide support mechanism including a spline mechanism having a slide shaft mounted on one of the miter saw unit and the base, and a sleeve member mounted on the other of the miter saw unit and the base;

the sleeve member being slidably movable relative to the slide shaft in an axial direction of the slide shaft, and the rotational position of the sleeve member being fixed relative to the slide shaft around an axis of the slide shaft.

Preferably, the spline mechanism is a ball spline mechanism.

Further, the miter saw may include a first cover and a second cover which are disposed on both sides of the sleeve member in the axial direction to form, around the spline shaft, a first air chamber and a second air chamber closed from the outside. The first and second covers are flexible to deform in response to movement of the sleeve member relative to the spline shaft in the axial direction. A communication device is provided for communication between the first and second air chambers.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 3:
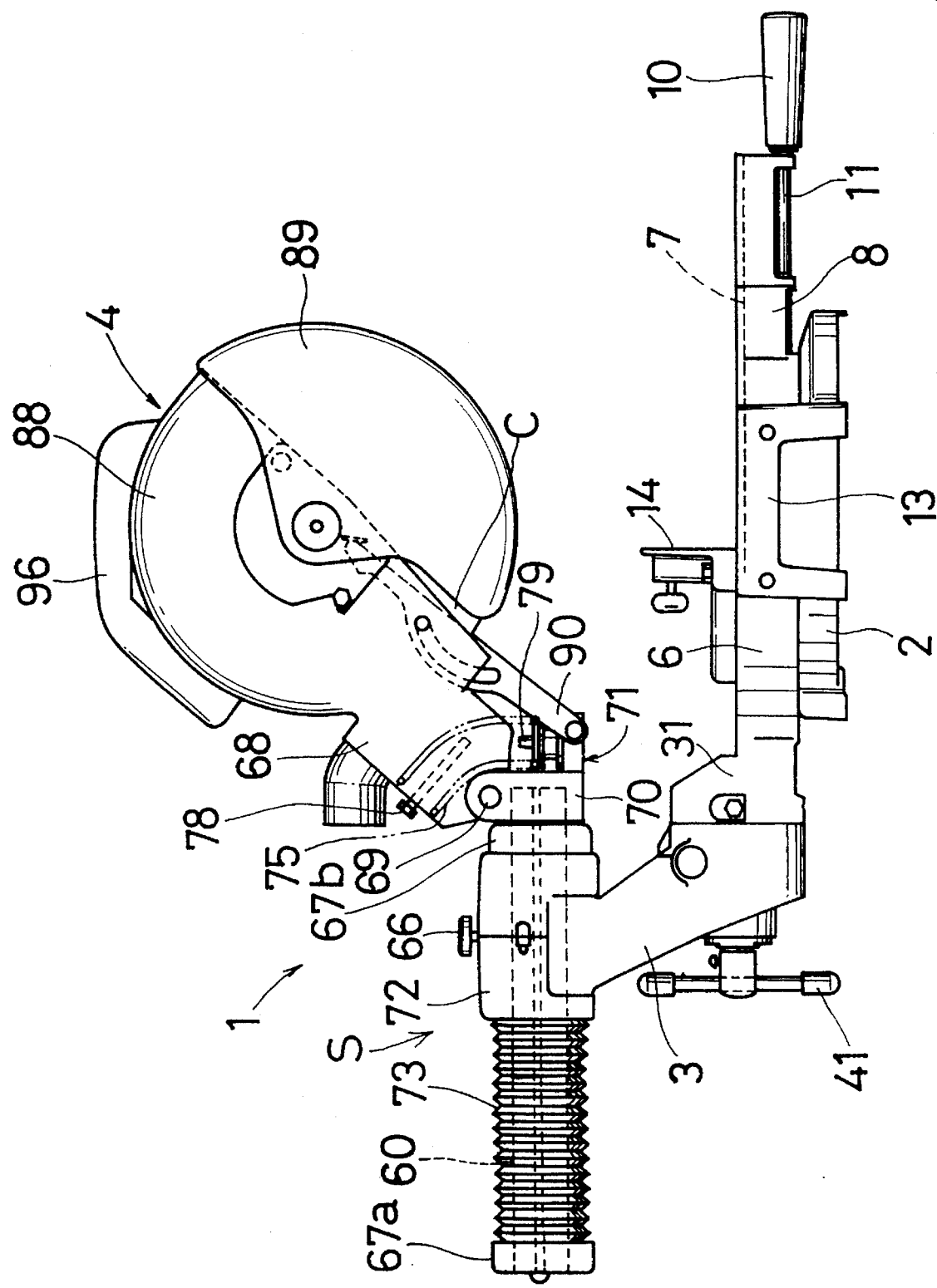
FIG. 3 is a side view of the miter saw.
Figure 4:
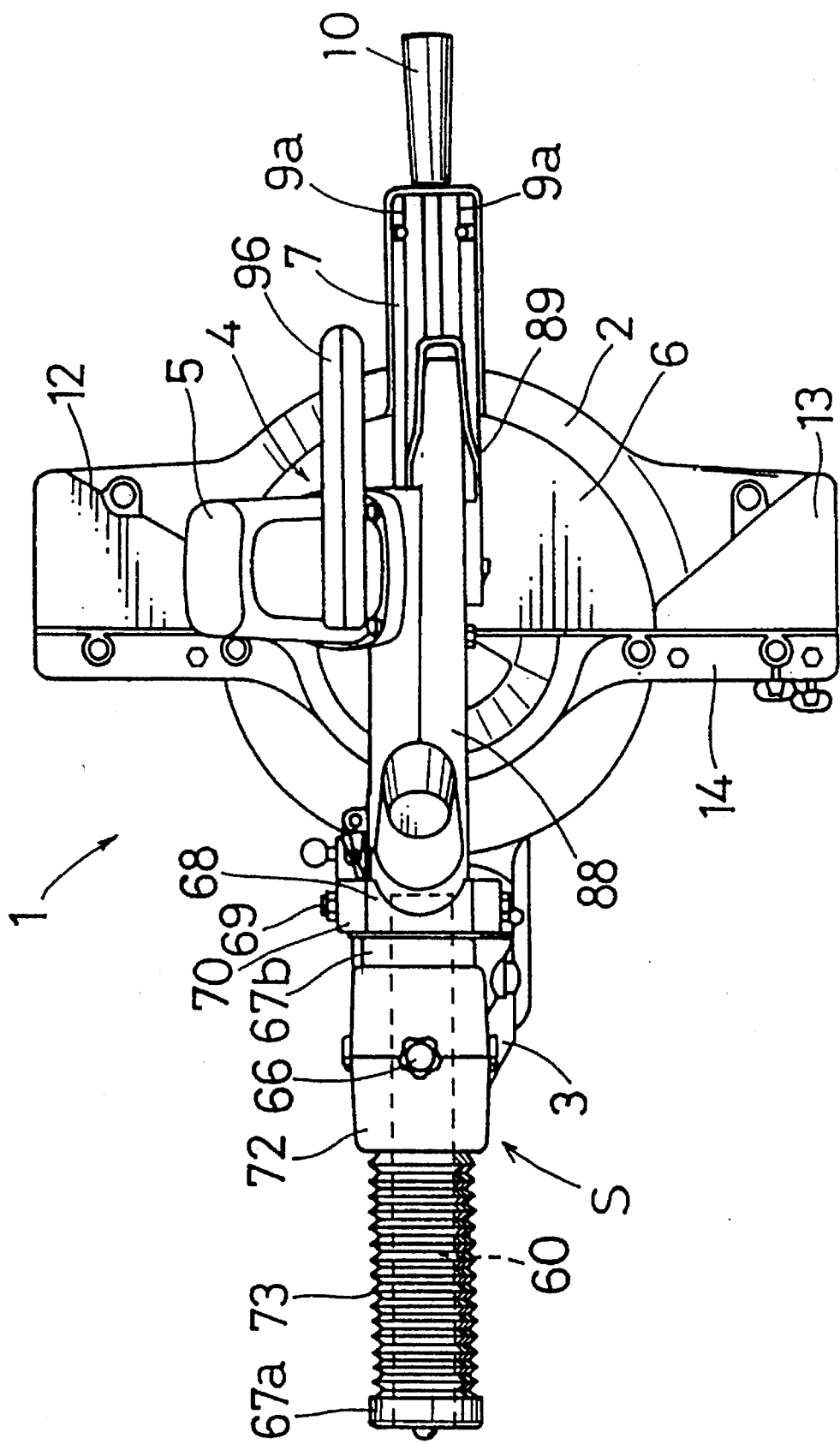
FIG. 4 is a plan view of FIG. 3.

Referring to FIGS. 3 and 4, a miter saw 1 is shown in side view and plan view, respectively.

The miter saw 1 includes a base 2 on which a work to be cut is placed. A miter saw unit 4 is mounted on the base 2 through a support member 3 having a support mechanism S for linear sliding movement of the miter saw unit 4 substantially in a horizontal direction or in a direction parallel to an upper surface of the base 2. A saw blade C is mounted on the miter saw unit 4 and is rotatably driven by a motor M (see FIG. 6).

Figure 5:
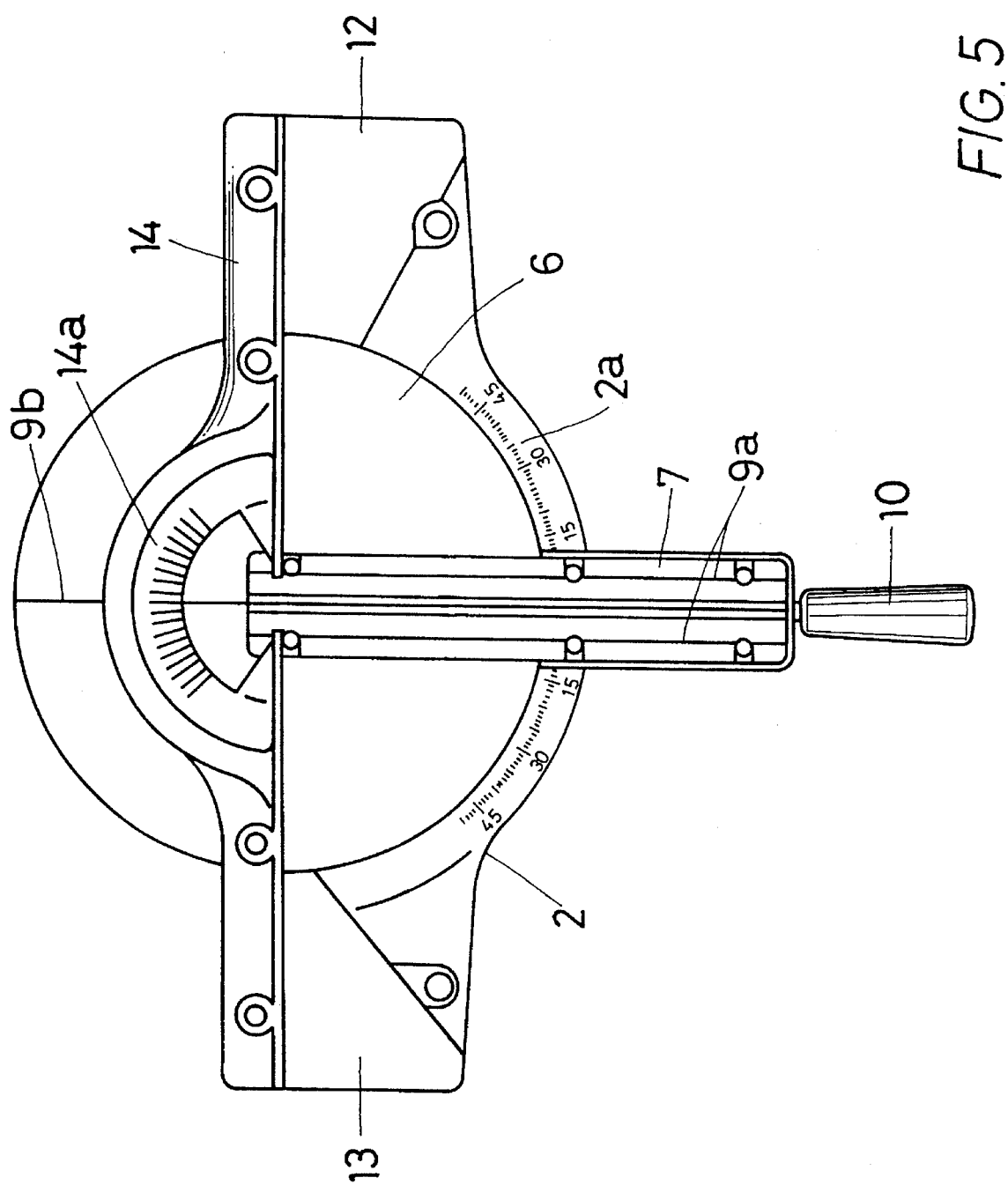
FIG. 5 is a plan view of a base and a turntable of the miter saw.

A turntable 6 is mounted on the upper surface of the base 2 and is rotatable within a horizontal plane by an angle of 45° with respect to a reference position in both clockwise and counterclockwise directions. As shown in FIG. 5, the rotational position of the turntable 6 can be correctly determined by reading a scale 2a affixed to the upper surface of the base 2 on the front side thereof.

An elongated plate 7 is mounted on the turntable 6 and extends radially outwardly from substantially the central portion of the turntable 6 (see FIG. 5). A support projection 8 having a U-shaped configuration in section is mounted on the turntable 6 and extends outwardly for supporting a part of the plate 7 extending outwardly from the turntable 6. A plurality of parallel lines 9a are drawn on the plate 7 and extend in a longitudinal direction of the plate 7. The lines 9a serve as reference lines for positioning of the work having an inked cutting line (not shown). The lines 9a are spaced from each other by an appropriate distance as shown in FIG. 4 which shows the plate 7 in the state prior to cutting by the saw blade C.

As shown in FIG. 3, an operational rod 11 for turning operation of the turntable 6 is rotatably mounted on the support projection 8 and includes a grip 10 for grasping by an operator at its outer end. The operational rod 11 is movable, through rotation thereof, toward and away from a part of an outer wall of the base 2 by a thread mechanism (not shown) provided between the operational rod 11 and the support projection 8, so that the turntable 6 can be selectively fixed in position at any turned position through operation of the operational rod 11.

As shown in FIG. 5, a line 9b is drawn on the turntable 6 for alignment with the inked line of the work. The line 9b extends from substantially the central portion of the turntable in a radial direction of the turntable 6 away from the plate 7.

As shown in FIGS. 4 and 5, a pair of table portions 12 and 13 are formed integrally with the base 2 at positions on both sides in a lateral direction. Upper surfaces of the table portions 12 and 13 are positioned at substantially the same height as the upper surface of the turntable 6, so that they serve to support the work placed on the turntable 6. A fence member 14 is mounted on the table portions 12 and 13 over the turntable 6, so that the position of the work can be determined through abutment of one of lateral surfaces of the work on the fence member 14. The fence member 14 includes an arcuate portion at its central portion on which a scale 14a is affixed for indication of the turning angle of the turntable 6. Thus, the operator can recognize the turning angle of the turntable 6 by reading the value of the scale 14a indicated by the line 9b.

The construction of the support member 3 for supporting the miter saw unit 4 will now be explained with reference to FIGS. 3 and 4.

The support member 3 is laterally pivotally supported by a bracket 31 formed integrally with the turntable 6. The bracket 13 is disposed at a position opposite to the support projection 8 for supporting the plate 7 as shown in FIG. 3. The pivotal axis of the support member 3 extends substantially in parallel to the longitudinal axis of the plate 7 at substantially the same height as the upper surface of the base 2. The support member 3 is permitted to pivot from a vertical position by an angle 45° in both left and right directions, so that the miter saw unit 4 can be pivoted as indicated by dashed lines in FIG. 6. The pivotal position of the support member 3 can be fixed by tightening a handle 41 through rotation thereof in one direction, while the pivotal position can be changed by loosening the handle 41 through rotation thereof in the other direction.

The slide support mechanism S for slidably supporting the miter saw unit 4 is disposed on the upper portion of the support member 3 which is supported on the turntable 6. The slide support mechanism S is constructed as an angular-contact ball spline and includes two sleeve members 62 and 63, and a slide bar such as a spline shaft or slide shaft 60 on which the sleeve members 62 and 63 are mounted. The sleeve members 62 and 63 are slidably movable along the slide shaft 60 in an axial direction and the rotational position of the sleeve members 62 and 63 is fixed relative to the slide shaft 60 as will be hereinafter explained.

The construction of the slide support mechanism S will now be explained with reference to FIGS. 1 and 2. The sleeve members 62 and 63 are fitted within a cylindrical support portion 61 formed integrally with the support member 3 and are positioned coaxially therewith as shown in FIG. 1.

Figure 1:
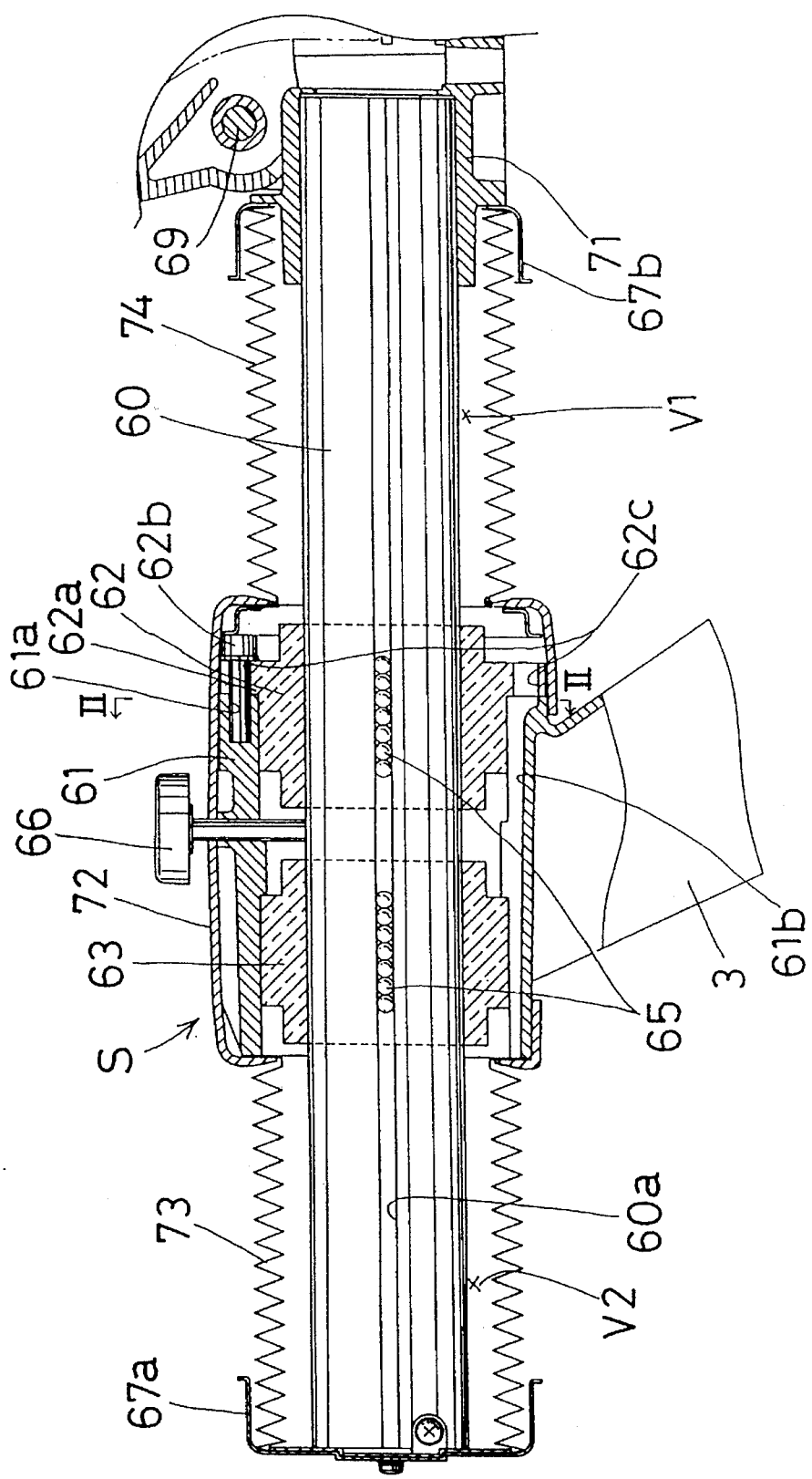
FIG. 1 is a vertical sectional view of a slide support mechanism of a miter saw according to an embodiment of the present invention.
Figure 2:
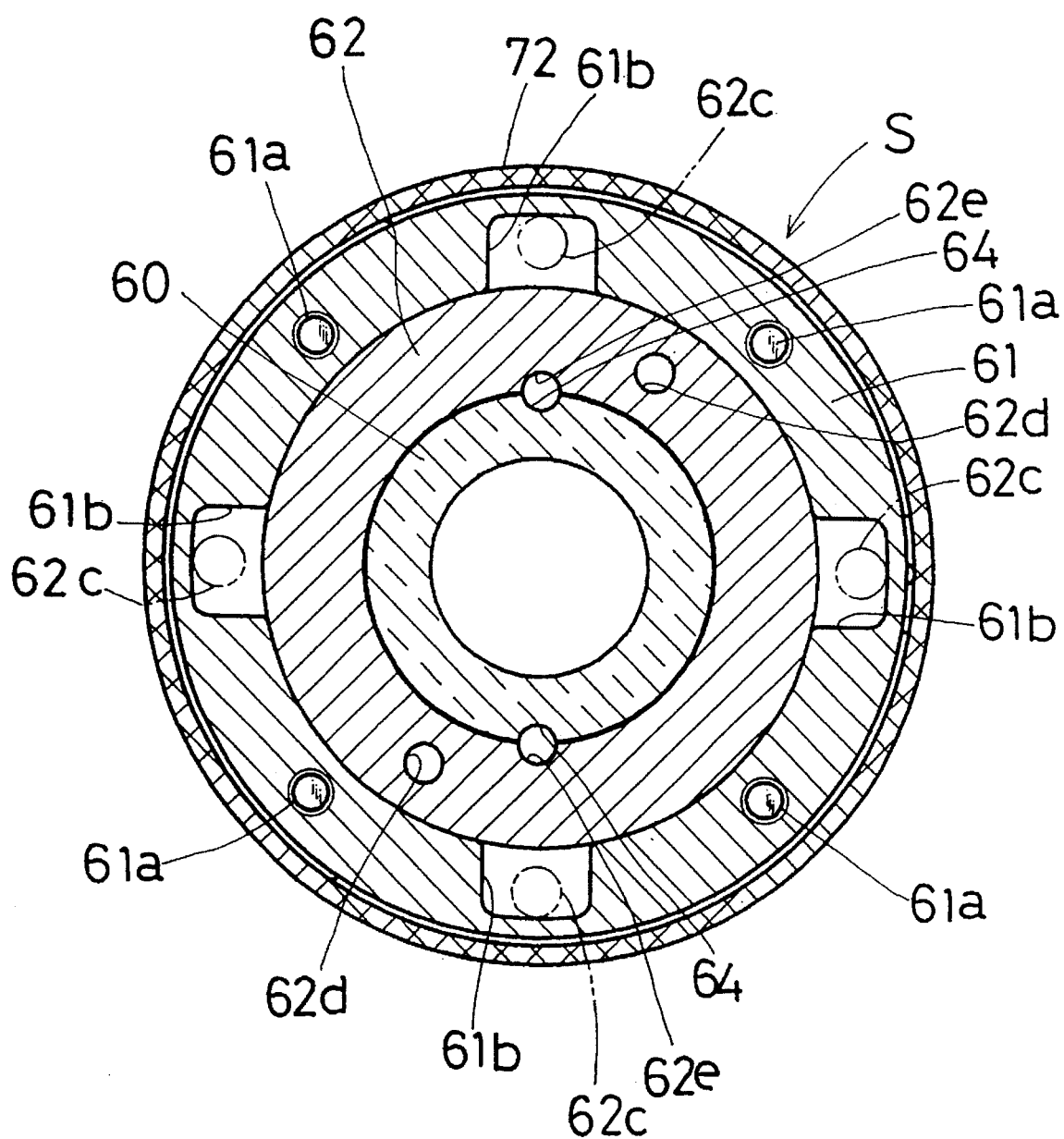
FIG. 2 is an enlarged sectional view taken along line II—II in FIG. 1.

As shown in FIG. 2, the support portion 61 includes four grooves or air channels 61b formed on its inner surface and equally spaced from each other in a circumferential direction. Each of the air channels 61b extends throughout the length of the support portion 61 as shown in FIG. 1.

The sleeve member 62 positioned on the right side in FIG. 1 includes a flange portion 62a for abutment on one end surface of the support portion 61. Bolts 62b are inserted into inserting holes 62c formed on the flange portion 62a and are engaged with threaded holes 61a formed on the end surface of the support portion 61. Here, as shown in FIG. 2, eight inserting holes 62c are formed on the flange portion 62a and are equally spaced from each other in a circumferential direction, while four threaded holes 61a are formed on the support portion 61 and are equally spaced from each other in a circumferential direction. Thus, the four bolts 62b are inserted into four of the inserting holes 62c which are alternately arranged. The remaining four of the inserting holes 62c which do not receive the bolts 62b are positioned in alignment with the air channels 61b of the support portion 61 so as to communicate therewith. These remaining inserting holes 62c and the air channels 61b cooperate to provide communication between air chambers V1 and V2 formed forwardly and rearwardly of the support portion 61 as will be explained later.

A pair of linear recesses 62e are formed on the inner surface of each of the sleeve members 62 and 63 at positions opposed to each other in a diametrical direction. Each of the linear recesses 62e has substantially V-shaped configuration in section and receives a plurality of balls 65 as rolling members, so that each of the balls 65 is partly received by the linear recess 62e in contact relationship with its bottom at two positions as will be explained later. A pair of return holes 62d are formed on each of the sleeve members 62 and 63 and are in communication with their corresponding linear recesses 62e, respectively, so as to form a pair of circulation tracks for the balls 65.

A pair of linear guide recesses 60a are formed on the outer surface of the slide bar 60 at positions diametrically opposed to each other. Each of the guide recesses 60a has substantially V-shaped configuration in section similar to the linear recess 62e and serves to receive the balls 65, so that each of the balls 65 is received between the guide recess 60a and the confronting linear recess 62e. Thus, each of the balls 65 is partly received by the guide recess 60a on one hand, and is partly received by the linear recess 62e on the other hand.

The slide shaft 60 is forcibly inserted into the sleeve members 62 and 63 such that a predetermined pressure is applied to the balls 65 between the guide recess 60a and the confronting linear recess 62e.

Figure 7:
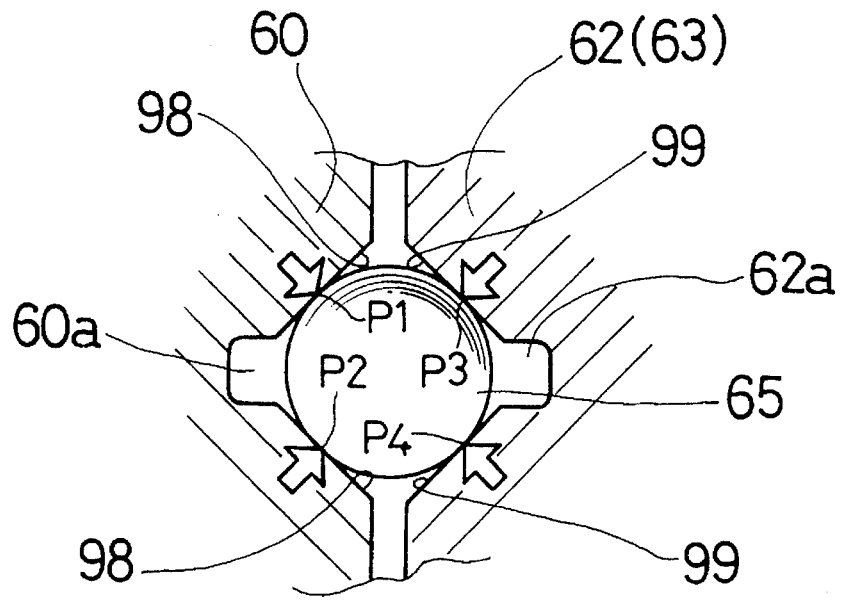
FIG. 7 is an enlarged sectional view of a part of the slide support mechanism showing a ball and linear recesses for receiving the ball.

As shown in FIG. 7, the guide recess 60a and the linear recess 62e having V-shaped configuration as explained above include a pair of contact surfaces 98 and a pair of contact surfaces 99, respectively. The contact surfaces 98 and 99 are formed as flat surfaces and contact the ball 65 at four points P1, P2, P3 and P4 which are equally spaced from each other around the circumference, of the ball 65. With this construction, the sleeve members 62 and 63 can be reliably prevented from rotation relative to the shaft shaft 60.

Figure 8:
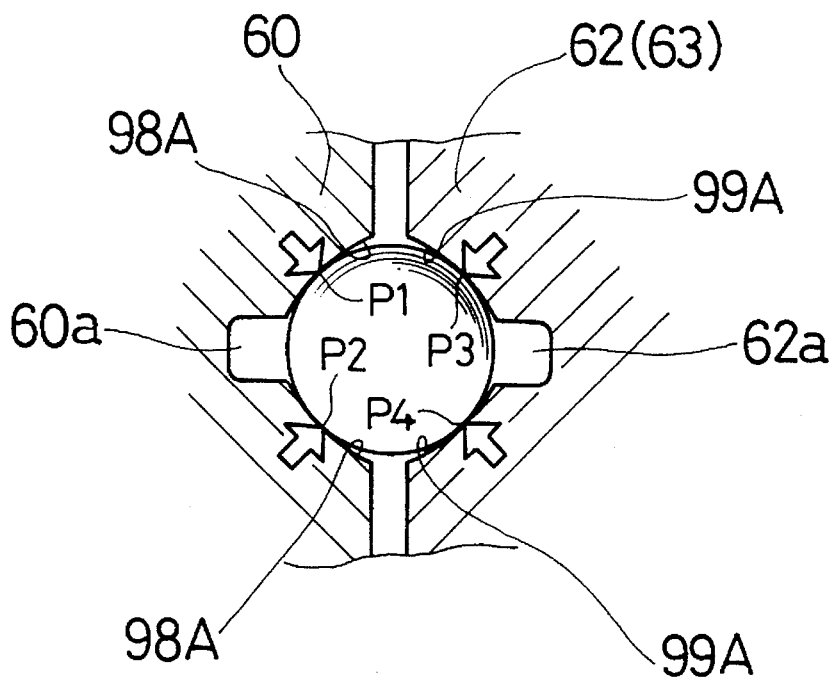
FIG. 8 is a view similar to FIG. 7 but showing a modification of the linear recesses.

Alternately, the contact surfaces 98 and 99 may be replaced by curved contact surfaces 98A and 99A each having a curvature slightly larger than that of the ball 65 as shown in FIG. 8.

Here, although the sleeve member 62 positioned on the right side in FIG. 1 is fixed to the support portion 61 by the bolts 62b as explained above, the sleeve member 63 positioned on the left side is fitted within the support portion 61 to prevent rotation relative to the support portion 61 to some extent through frictional force, so that the moment applied to the slide shaft 60 around its axis is borne by the sleeve member 62 while the bending moment applied to the slide shaft 60 is borne by the sleeve members 62 and 63 through cooperation with each other.

As shown in FIG. 1, a forward portion of the slide shaft 60 is fixedly fitted within a bracket 71 formed integrally with a fork-shaped connecting portion 70 (see FIG. 3) which vertically pivotally supports the miter saw unit 4 by a pivotal shaft 69.

As shown in FIGS. 1 and 4, a cover 72 is mounted on the support portion 61 so as to substantially cover the whole outer surface of the support portion 61. A bolt 66 extends through the cover 72 and is threadably engaged with the support portion 61 so as to fix the slide shaft 60 in position relative to the support portion 61. The slide shaft 60 is formed as a hollow shaft to reduce its weight.

A rear cap 67a is mounted on a rear end of the slide shaft 60. A front cap 67b is mounted on the bracket 71 to which the forward portion of the slide shaft 60 is fixed. Cylindrical bellows 73 and 74 are disposed between the rear cap 67a and the rear end of the cover 72 and between the forward end of the cover 72 and the cap 67b, respectively, so that parts of the slide shaft 60 extending outwardly from the support portion 61 are covered by the bellows 73 and 74 so as not to be exposed to the outside. End portions of the bellows 73 and 74 are closely fitted on their corresponding caps 67a or 67b and the cover 72, so that the air chambers V1 and V2 closed from the outside are formed within the bellows 73 and 74 at positions rearwardly and forwardly of the support portion 61, respectively. Thus, deposition of dust on the slide shaft 60 is prevented, and the slide shaft 60 may not be rusted. The air chambers V1 and V2 communicate with each other through the air channels 61b and the inserting holes 62c as previously described.

The construction of the miter saw unit 4 will now be explained.

As shown in FIG. 3, the miter saw unit 4 includes a base portion 68 vertically pivotally supported by the fork-shaped connecting portion 70 by the pivotal shaft 69 as previously described. A compression spring 75 is interposed between the base portion 68 and the bracket 71 and normally biases the miter saw unit 4 in an upward pivotal direction. A bolt 78 is threadably engaged with the base portion 68 and extends substantially along the pivotal direction of the miter saw unit 4. A stopper member 79 is mounted on the bracket 71 for abutment on a lower end of the bolt 78, so that the lower stroke end of the pivotal movement of the miter saw unit 4 is limited by the bolt 78 through its abutment on the stopper member 79 and can be adjusted through adjustment of position of the bolt 78.

Figure 6:
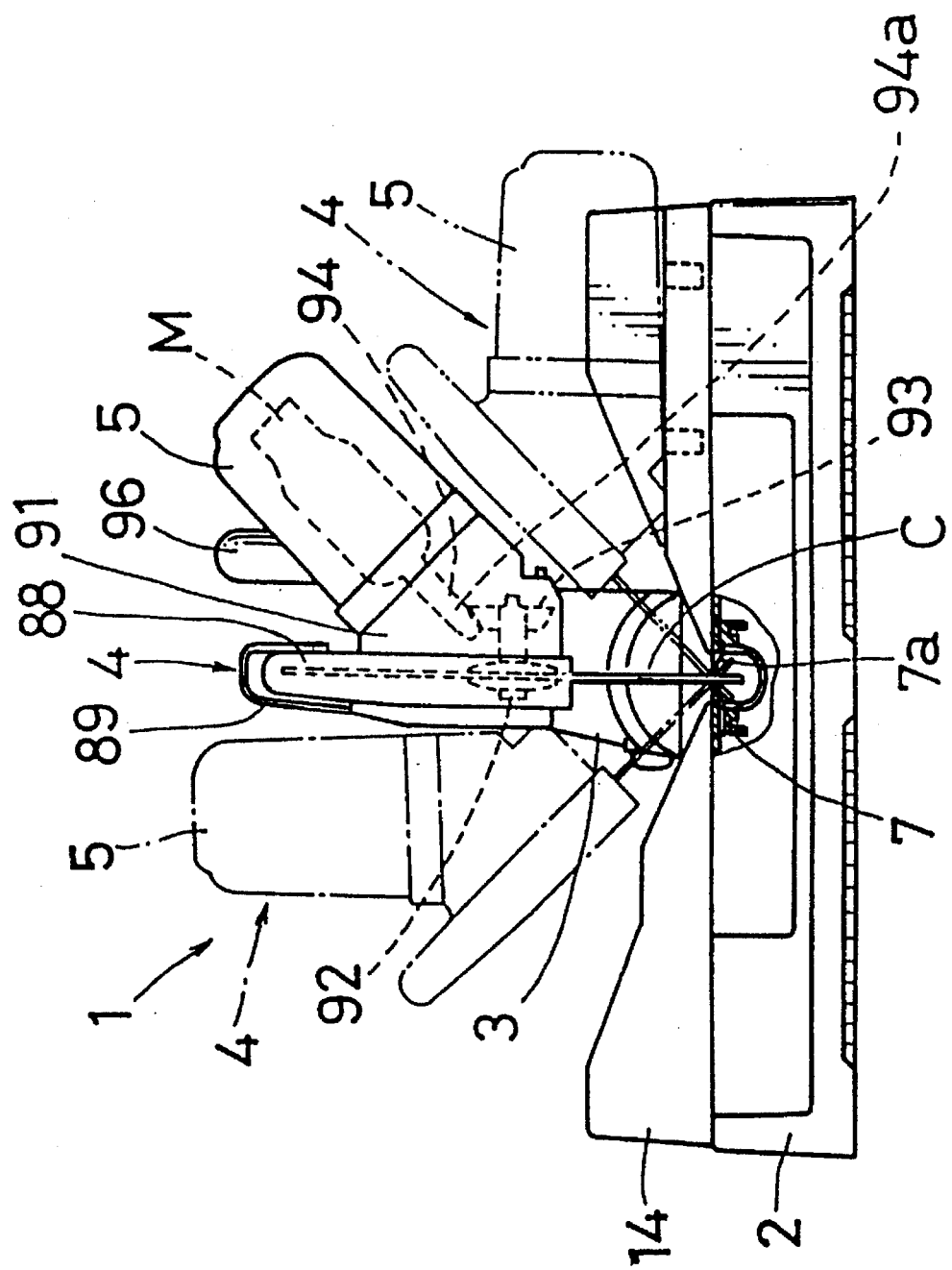
FIG. 6 is a front view, with a part broken away, of the miter saw showing the operation for laterally pivoting a miter saw unit.

As shown in FIGS. 3, 4 and 6, a motor housing 5 is formed integrally with the miter saw unit 4 and accommodates a motor M therein. The motor housing 5 as well as the motor M has a longitudinal direction extending obliquely relative to the saw blade C, so that the motor housing 5 extends obliquely upwardly from the miter saw unit 4 on one side thereof when the saw blade C is positioned vertically relative to the base 2 as shown by a solid line in FIG. 6. A handle 96 is mounted on the upper portion of the motor housing 5 for operation by the operator to move the miter saw unit 4.

The miter saw unit 4 includes a blade case 88 which covers substantially the upper half of the saw blade C and is formed integrally with the base portion 68. A safety cover 89 for covering the exposed lower half of the saw blade C is rotatably mounted on the blade case 88 around the same axis as the saw blade C. A lever 90 is pivotally supported by the bracket 71 and has one end associated with the safety cover 89 such that the safety cover 89 is rotated in a direction to uncover the saw blade C as the miter saw unit 4 is pivoted downwardly from its uppermost position.

As shown in FIG. 6, a gear housing 91 is formed integrally with the blade case 88 on its right side. A spindle 92 for mounting the saw blade C thereon is supported within the gear housing 91. A bevel gear 93 as a reduction gear is mounted on the spindle 92. The motor housing 5 is formed integrally with the gear housing 91 on its right side and extends obliquely upwardly therefrom. An output shaft 94 of the motor M disposed within the motor housing 5 extends obliquely upwardly relative to the saw blade C by an angle of 45°. A pinion 94a is formed with the output shaft 94 and is in engagement with the bevel gear 93.

The operation of the above embodiment will now be explained.

Firstly, the work to be cut is placed on the base 2 such that it extends over the table portions 12 and 13. Then, the position of the work is determined by abutting its lateral surface on the fence member 14 or by positioning the inked line drawn on the work with reference to any of the lines 9a or 9b. The work is thereafter fixed in position.

Before using the miter saw i to cut the work, the plate 7 is cut by the saw blade C to form a cut slot 7a through a vertical cutting operation with the support member 3 positioned vertically relative to the base 2. Other than such a vertical cutting operation, the miter saw 1 of this embodiment is operable to perform an oblique cutting operation with the support member 3 inclined laterally relative to the base 2 as will be explained later. When such an oblique cutting operation is performed, the width of the cut slot 7a becomes larger, so that the position of the work cannot be precisely determined with reference to the cut slot 7a. Therefore, in case of the prior art miter saw, the position of the work is normally adjusted such that the inked line drawn on the work is brought to align with the cutting edge of the saw blade C.

In case of the miter saw 1 of this embodiment, the work can be reliably positioned by determining the position of the inked line drawn on the work, with reference to the lines 9a drawn on the plate 7, through calculation of the distances between the saw blade C and the lines 9a when forming the cut slot 7a.

Further, in this embodiment, the line 9b is drawn on the turntable 6 in a radial direction of the turntable 6 and is in alignment with the cutting edge of the saw blade C. Therefore, the position of the work can be reliably determined in a simple manner through alignment of the inked line on the work with the line 9b.

After fixing the position of the work thus determined, any of the vertical cutting operation and the oblique cutting operation is performed. In the vertical cutting operation, the saw blade C is positioned vertically relative to the base 2 as indicated by solid lines in FIG. 6. In the oblique cutting operation, the miter saw unit 4 as well as the support member 3 is inclined laterally in either one of left and right directions relative to the base 2, so that the saw blade C is positioned obliquely relative to the base 2 as indicated by dashed lines in FIG. 6.

To perform the vertical cutting operation, the operator rotates the handle 1 to fix the support member 3 in a vertical position. The operator then grasps the handle 96 of the miter saw unit 4 and presses the same downwardly against the biasing force of the compression spring 75 so as to pivot the miter saw unit 4 downwardly relative to the support member 3 around the pivotal shaft 69. As the miter saw unit 4 is thus pivoted downwardly, the safety cover 89 is rotated to gradually expose the saw blade C to the outside. The lower half of the saw blade C is entirely exposed when the saw blade C reaches the work. The downward pivotal movement of the miter saw unit 4 is stopped at a lower stroke end where the bolt 78 of the base portion 68 abuts on the stopper member 79 and where the lower part of the saw blade C extends downwardly through the plate 7.

To perform the oblique cutting operation, the support member 3 is fixed in position at either one of inclined positions shown in FIG. 6. The operator then presses the handle 96 of the miter saw unit 4 downwardly against the biasing force of the compression spring 75, so that the oblique cutting operation can be performed. When the miter saw unit 4 reaches the lower stroke end where the bolt 78 of the base portion 68 abuts on the support member 79, the lower part of the saw blade C extends downwardly through the plate 7 by the same distance as the vertical cutting operation.

Here, since the motor housing 5 extends obliquely relative to the blade case 88, the motor housing 5 does not interfere with the turntable 6 even if the support member 3 is inclined rightwardly as shown in FIG. 6. Therefore, the cutting operation can be reliably performed with the support member 3 inclined at a maximum angle of 45° in either of rightward and leftward directions.

Further, in both vertical and oblique cutting operations, the cutting operation can be performed with the miter saw unit 4 moved in forward and rearward directions by means of the slide support mechanism S which slidably supports the miter saw unit 4 to be linearly slidably moved within the horizontal plane or the plane parallel to the base 2. Thus, the operator rotates the bolt 66 to loosen the same to permit movement of the slide shaft 60 relative to the support member 3. Then, the operator grasps the handle 96 of the body 4 and pulls the miter saw unit 4 forwardly, so that the miter saw unit 4 is moved forwardly through movement of the slide shaft 60 relative to the support portion 61. With such movement of the miter saw unit 4, the work can be cut throughout its width by the saw blade C even if it has a large width.

As described above, the slide support mechanism S is constructed as an angular-contact ball spline having the sleeve members 62 and 63, the slide shaft 60 and the balls 65 interposed therebetween. Since no slide shaft other than the slide shaft 60 is required for this support mechanism S, the support portion 61 as well as the support mechanism S can be constructed to have a narrower width as compared with the prior art miter saw unit having two slide shafts. Further, such a narrower width of the support mechanism S permits the inclination angle of the support member 3 to have a larger value and permits the oblique cutting operation of the work having a large thickness.

Additionally, since the slide shaft 60 is forcibly inserted into the sleeve members 62 and 63 such that the balls 65 contact them without backlash, no rattling is caused when the miter saw unit 4 is pivoted in the vertical direction. Thus, in this embodiment, no complicated mechanism as incorporated in U.S. Pat. No. 5,054,352 is required, so that the support mechanism S may have a simple construction.

Further, the bending moment applied to the slide shaft 60 during the cutting operation is borne by two slide members 62 and 63, so that the durability of the miter saw can be improved.

In the slide support mechanism S, the parts of the slide shaft 60 exposed outside the support portion 61 are covered by the bellows 73 and 74 to prevent deposition of dust or to prevent rusting. The air chambers V1 and V2 closed from the outside are thus formed on both sides forwardly and rearwardly of the support portion 61. The air chambers V1 and V2 communicate with each other through the air channels 61b formed on the support portion 61 and the inserting holes 62c formed on the flange portion 62a of the sleeve member 62. The air channels 61b and their corresponding inserting holes 62c are provided by four in number, respectively, in the circumferential direction to provide a sufficient opening area for communication between the chambers V1 and V2. When the bellows 73 and 74 are compressed and expanded as the slide bar 60 is moved relative to the support portion 61, the air within the chamber V1 and the air within the chamber V2 is exchanged with each other while the air is moved rapidly. Therefore, the slide shaft 60 can be rapidly smoothly moved without receiving the resistance force by compressed air. Thus, the operation for sliding movement of the miter saw unit 4 can be improved, and no unpleasant respiration sound is produced during such movement of the miter saw unit 4.

Although in the above embodiment, the angular-contact ball spline is incorporated as the slide support mechanism S, such a slide support mechanism may be a square key spline or serration mechanism which is precisely machined to prevent backlash in the circumferential direction.

Further, although in the above embodiment, the sleeve members 62 and 63 are mounted on the base 2, while the slide shaft 60 is mounted on the miter saw unit 4, the sleeve members 62 and 63 and the slide shaft 60 may be mounted on the miter saw unit 4 and the base 2, respectively.

Additionally, although in the above embodiment, the air channels 61b formed on the support portion 61 and the insert holes 62c formed on the sleeve member 62 are provided for communication between the air chambers V1 and V2, any other means such as a communication tube connected between the air chambers V1 and V2 can be incorporated for such communication.

While the invention has been described with reference to a preferred embodiment, it is to be understood that modifications or variations may be easily made without departing from the spirit of this invention which is defined by the appended claims.

What is claimed is:

1. A miter saw comprising:

a base means for placing a work thereon;

a miter saw unit having a saw blade mounted thereon;

a slide support mechanism for slidably supporting said miter saw unit relative to said base means;

said slide support mechanism including a slide shaft and a sleeve member, said slide shaft being mounted on one of said base means and said miter saw unit, and said sleeve member mounted on the other of said base means and said miter saw unit;

said slide shaft and said sleeve member being slidably movable relative to each other in an axial direction of said slide shaft;

deformable first and second covers disposed on opposite sides of said sleeve member in said axial direction to surround said slide shaft;

said first and second covers forming, around said slide shaft, a first air chamber and a second air chamber closed from the outside; and communication means for communication between said first air chamber and said second air chamber.

2. The miter saw as defined in claim 1, said base means including a base, a turntable mounted on said base, and a support member mounted on a peripheral portion of said turntable and extending upwardly therefrom, the sleeve member of said slide support mechanism being supported by the support member, said slide shaft being inserted into the support member, and on one end of such slide shaft said miter saw unit is mounted for vertically pivoting.

3. The miter saw as defined in claim 2 wherein said support member is mounted on said turntable so as to pivot laterally.

4. The miter saw as defined in claim 1 wherein said sleeve member is supported within a cylindrical support portion formed integrally with a support member mounted on said base means; and said communication means is a communication channel formed in said cylindrical support portion extending in the axial direction of said slide shaft.

5. The miter saw as defined in claim 4 wherein said first and second covers are disposed between one end of said cylindrical support portion and a corresponding one end of said slide shaft and between another end of said cylindrical support portion and another end of said slide shaft, respectively;

said first and second covers are sealingly attached to corresponding ends of said cylindrical support portion and said slide shaft.

6. The miter saw as defined in claim 1 wherein said first and second covers are bellows deformable to be expanded and to be compressed in the axial direction of said slide shaft.

7. The miter saw as defined in claim 1 wherein said slide shaft is formed as a spline shaft, so that a rotational position of said sleeve member is fixed relative to the spline shaft around an axis of the spline shaft.

8. The miter saw as defined in claim 7 wherein said slide shaft includes, on an outer surface, a first linear recess extending in the axial direction; said sleeve member includes, on an inner surface, a second recess extending in parallel to said first linear recess in confronting relationship therewith; and rolling members which are forcibly inserted between said first and second linear recesses so that a predetermined pressure is applied.

9. The miter saw as defined in claim 8 wherein said second linear recess of said sleeve member constitutes a part of a circulation track of said rolling members formed in said sleeve member.

10. The miter saw as defined in claim 8 wherein said spline shaft is an angular-contact ball spline including a plurality of balls as said rolling members; and wherein each of said first and second linear recesses has substantially V-shaped configuration in section and includes two contacting surfaces in substantially point-contacts with each of said balls, so that each of said balls contacts said contacting surfaces of said first and second linear recesses at four positions.

11. The miter saw as defined in claim 10 wherein said four positions are equally spaced from each other around the circumference of each of said balls.

12. The miter saw as defined in claim 10 wherein said spline shaft is forcibly inserted into said sleeve member, so that each of said balls forcibly contacts said contacting surfaces.

13. The miter saw as defined in claim 7 wherein said sleeve member includes a first and second sleeve disposed in the axial direction of said slide shaft and fixed in position in the axial direction by support means mounted between said miter saw unit and said base means.

14. The miter saw as defined in claim 1 wherein said slide shaft includes, on an outer surface, a first pair of linear recesses extending in the axial direction; wherein said sleeve member includes, on an inner surface, a second pair of recesses extending in parallel to said first pair of linear recesses in confronting relationship therewith; and rolling members which are forcibly inserted between said first pair and second pair of linear recesses, said first linear recesses as well as said second linear recesses are located at positions diametrically opposed to each other with respect to said slide shaft.

15. A miter saw comprising:

a base means for placing a work thereon;

a miter saw unit having a saw blade mounted thereon;

a slide support mechanism for slidably supporting said miter saw unit relative to said base means;

said support mechanism including a bracket, a slide shaft slidably supported in a first and a second sleeve member, said first and second sleeve member being fitted within a cylindrical support portion formed integrally with said bracket, the miter saw unit mounted on one end of said slide shaft;

said slide shaft being slidably movable relative to said sleeve members in an axial direction of said slide shaft;

deformable first and second covers disposed on opposing sides of said first and second sleeve member in the axial direction to surround said slide shaft;

said first and second covers forming, around said slide shaft, a first air chamber and a second air chamber closed from the outside; and means for communication between said first air chamber and said second air chamber to enable equalization of pressure with the first and second air chamber.

* * * * *